(12) United States Patent
Pendray

(10) Patent No.: US 8,857,383 B2
(45) Date of Patent: Oct. 14, 2014

(54) APPARATUS, SYSTEMS, AND METHODS TO ADDRESS EVAPORATIVE COOLING AND WET COMPRESSION FOR ENGINE THERMAL MANAGEMENT

(75) Inventor: John R. Pendray, Blaine, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 287 days.

(21) Appl. No.: 12/825,516

(22) Filed: Jun. 29, 2010

(65) Prior Publication Data

US 2010/0326399 A1    Dec. 30, 2010

Related U.S. Application Data

(60) Provisional application No. 61/269,844, filed on Jun. 30, 2009.

(51) Int. Cl.

| | |
|---|---|
| *F02M 27/04* | (2006.01) |
| *F01B 1/12* | (2006.01) |
| *F02M 25/022* | (2006.01) |
| *F02M 25/028* | (2006.01) |
| *F02D 41/00* | (2006.01) |
| *F02B 47/02* | (2006.01) |
| *F02M 35/08* | (2006.01) |
| *F02B 47/08* | (2006.01) |
| *F02M 25/07* | (2006.01) |
| *F02M 27/08* | (2006.01) |
| *F02B 1/12* | (2006.01) |

(52) U.S. Cl.
CPC ............... *F02M 25/028* (2013.01); *F01B 1/12* (2013.01); *F02M 25/0225* (2013.01); *F02M 25/0222* (2013.01); *F02D 41/0025* (2013.01); *F02B 47/02* (2013.01); *F02M 35/088* (2013.01); *F02B 47/08* (2013.01); *F02M 27/04* (2013.01); *F02M 25/0227* (2013.01); *F02M 25/074* (2013.01); *F02M 27/08* (2013.01); *F02B 1/12* (2013.01); *F02M 25/0228* (2013.01)
USPC ........................ 123/25 J; 123/25 A; 123/25 C

(58) Field of Classification Search
USPC ....................................... 123/25 J, 25 C, 25 A
See application file for complete search history.

(56) References Cited

U.S. PATENT DOCUMENTS 3,964,263 A * 6/1976 Tibbs .......................... 123/25 C
4,105,418 A    8/1978 Mohnhaupt (Continued)

FOREIGN PATENT DOCUMENTS

| JP | 05195800 A | * 8/1993 | ............. F02B 47/02 |
|---|---|---|---|
| WO | 2004025102 | 3/2004 | |

OTHER PUBLICATIONS

Jolly, Sanjeev; Wet Compression—A Powerful Means of Enhancing Combustion Turbine Capacity; Dec. 2002; Presented at Power-Gen Internation; pp. 1-11.*

(Continued)

*Primary Examiner* — Noah Kamen
*Assistant Examiner* — Grant Moubry
(74) *Attorney, Agent, or Firm* — Foley & Lardner LLP

(57) ABSTRACT

An apparatus including a reciprocating internal combustion engine with at least one piston and cylinder set and an intake stream; at least one liquid atomizer in fluid communication with the intake stream operable to provide a plurality of liquid droplets with a diameter less than 5 μm to the intake stream; and a controller where the controller is able to adjust an index of compression for the engine by: calculating a wet compression level in response to an engine operating limit and adjusting the at least one liquid atomizer in response to the wet compression level.

16 Claims, 4 Drawing Sheets

(56) References Cited

U.S. PATENT DOCUMENTS

| | | | |
|---|---|---|---|
| 4,279,223 A | 7/1981 | Csonka et al. | |
| 4,558,665 A | 12/1985 | Sandberg et al. | |
| 4,632,067 A * | 12/1986 | Carlson | 123/25 A |
| 4,960,080 A | 10/1990 | O'Neill et al. | |
| 5,148,776 A * | 9/1992 | Connor | 123/25 J |
| 5,718,194 A * | 2/1998 | Binion | 123/25 C |
| 5,832,728 A | 11/1998 | Buck | |
| 5,930,990 A * | 8/1999 | Zachary et al. | 60/39.53 |
| 5,937,799 A * | 8/1999 | Binion | 123/25 C |
| 6,112,705 A | 9/2000 | Nakayama et al. | |
| 6,173,564 B1 * | 1/2001 | Zachary | 60/39.091 |
| 6,197,835 B1 * | 3/2001 | Ganan-Calvo | 516/10 |
| 6,216,443 B1 | 4/2001 | Utamura | |
| 6,415,756 B1 | 7/2002 | Lee | |
| 6,453,659 B1 * | 9/2002 | Van Liere et al. | 60/39.53 |
| 6,516,603 B1 * | 2/2003 | Urbach et al. | 60/39.3 |
| 6,571,749 B2 | 6/2003 | Singh | |
| 6,688,108 B1 | 2/2004 | Van Liere | |
| 6,698,387 B1 * | 3/2004 | McFarland et al. | 123/25 A |
| 6,711,888 B2 | 3/2004 | Horii et al. | |
| 6,851,413 B1 * | 2/2005 | Tamol, Sr. | 123/536 |
| 6,912,978 B2 * | 7/2005 | Raikio et al. | 123/25 R |
| 7,021,272 B2 | 4/2006 | Singh | |
| 7,231,893 B2 * | 6/2007 | Sundholm | 123/25 R |
| 7,234,437 B2 | 6/2007 | Hiraya et al. | |
| 7,255,067 B1 | 8/2007 | Thorpe | |
| 7,299,770 B2 | 11/2007 | Thorpe | |
| 7,310,950 B2 | 12/2007 | Dovali-Solis et al. | |
| 7,314,033 B2 * | 1/2008 | Cohn et al. | 123/198 A |
| 7,320,298 B1 * | 1/2008 | Ahern | 123/25 R |
| 7,340,902 B2 | 3/2008 | Jimenez Haertel et al. | |
| 7,444,987 B2 | 11/2008 | Cohn et al. | |
| 7,513,222 B2 | 4/2009 | Orlosky | |
| 7,640,914 B2 | 1/2010 | Lewis et al. | |
| 7,739,985 B2 | 6/2010 | Keays | |
| 7,798,119 B2 | 9/2010 | Keays | |
| 7,938,103 B2 | 5/2011 | Keays | |
| 2003/0180155 A1 | 9/2003 | Coney et al. | |
| 2005/0172916 A1 * | 8/2005 | Sundholm | 123/25 G |
| 2006/0124079 A1 | 6/2006 | Singh | |
| 2006/0266307 A1 | 11/2006 | Mezheritsky | |
| 2007/0131180 A1 | 6/2007 | Roehm | |
| 2007/0151528 A1 * | 7/2007 | Hedman | 123/25 D |
| 2012/0260886 A1 | 10/2012 | Mulye | |

OTHER PUBLICATIONS

The International Bureau of WIPO. PCT International Preliminary Report on Patentability. PCT Patent Application No. PCT/US2010/040346. Jan. 4, 2012.

Callahan, Timothy J.; Dodge, Lee G.; Roberts, Charles E.; Stovell, Chad H.; Bourn, Gary D.; Khair, Magdi K.; Bartley, Gordon J.; "Technical Path Evaluation for High Efficiency, Low Emission Natural Gas Engine", May 2002.

Tschalamoff, Titus; LAAβ, Udo; Janicke, Dieter; "Direct Water Injection in a Medium Speed Gas Engine," MTZ, Nov. 2007, pp. 15-18, vol. 68.

* cited by examiner

APPARATUS, SYSTEMS, AND METHODS TO ADDRESS EVAPORATIVE COOLING AND WET COMPRESSION FOR ENGINE THERMAL MANAGEMENT

CROSS-REFERENCE TO RELATED APPLICATIONS

The present application claims priority to U.S. Patent Application No. 61/269,844 filed Jun. 30, 2009, which is hereby incorporated by reference in its entirety.

BACKGROUND

The present application relates to thermal management of an internal combustion engine, and more particularly, but not exclusively to evaporative cooling and wet compression of an internal combustion engine.

Engine knocking (also called detonation or spark knock and pinging) occurs in internal combustion engines when a portion of the air/fuel mixture in the cylinder does not combust with the rest of the air/fuel mixture in the cylinder at the precise time in the piston's stroke cycle as determined by the engine control system. The peripheral explosions create shock waves that can be heard by the operator. The effects of the engine knock shock waves can be of no consequence or catastrophic to the engine. In between these extremes, engine knock limits the compression ratio, ignition timing, and other engine operating parameters that effect efficiency on reciprocating internal combustion engines. Without engine knock, these parameters could be changed to enable more efficient operation and generally re-optimize the engine for superior performance.

Liquids can be used to cool combustion gases in internal combustion engines. The term wet compression refers to the act of vaporizing liquid during compression. The phase change from liquid to vapor consumes relatively large amounts of energy with a relatively small temperature change. Wet compression therefore allows a thermodynamic cycle that efficiently compresses an air/liquid mixture with a lower temperature increase than compressing dry air, enabling higher compression ratio and peak pressure at a constant peak temperature.

Humid air and water injection are related processes that provide some benefits to reciprocating internal combustion engines. Humid air cycles have been used in reciprocating engines and gas turbines to reduce NOx emissions. Water injection was used in WWII to increase aircraft engine power density, primarily for takeoff, but there are differences that allow wet compression to improve power density and efficiency relative to humid air and water injection.

Wet compression may be confused with humid air thermodynamic cycles. Humid air cycles inject steam or other non-reactive vapor into the air/fuel stream. Vapor injection increases the thermal mass of the air/fuel mixture and dilutes the charge air. The dilution decreases the tendency to knock while maintaining stoichiometric combustion. The larger thermal mass reduces the peak temperatures in the combustion chamber therefore reducing NOx formation.

Because humid air is already in vapor phase when mixed with the air/fuel stream, it cannot go through a phase change during compression. When humid air is compressed, the temperature increases almost as fast as if the air were dry. The temperature rise is slightly lower since the specific heat ratio of the vapor, e.g. water, is often lower than the specific heat ratio of the air/fuel mixture. Any improved knock margin is primarily dependant upon the dilution effect.

In water injection, large liquid droplets are added to an air/fuel stream to provide cooling from the phase change during compression and combustion. Upon injection, water droplets may follow one of two paths: collision with internal surfaces or entrainment in the airflow.

Large water droplets may collide with internal surfaces during airflow direction changes. The inertia of large water droplets can overwhelm the friction from surrounding airflow and hinder the droplet's ability to follow airflow changes around structures within the air ducting, intake manifold, and cylinder, causing droplet collisions with internal surfaces. If the surface is hot, such as in the cylinder, the liquid may vaporize, thus making the system act similar to humid air injection. If the droplet does not vaporize, it is pushed by the airflow along the internal surface. As it is moving, the liquid may coalesce with other liquid droplets. The ratio of surface area to volume decreases, which reduces the effects of air temperature on liquid vaporization. Surface wetting may also lead to engine corrosion issues such as cylinder liner scuffing and oil quality degradation.

If the droplets do not collide with a solid surface, they may remain in the airflow. Eventually, at least some of the droplets may arrive in the cylinder. During compression, the air temperature surrounding the droplets increases. Increased temperature causes heat to flow from the air to the water droplet. As the thermal gradient between the droplet and surrounding air increases, the heat transfer rate increases. Heat transfer across the large thermal gradients associated with large droplets increases system entropy, however, thus reducing cycle efficiency.

Sufficiently large droplets have enough thermal inertia to remain in liquid form during combustion. Large droplets have a lower surface area to volume ratio than small droplets. Because heat transfer depends upon surface area and heat required for total vaporization depends upon volume, large droplets may not have enough time to completely vaporize. When the large droplets are present during combustion, they lower peak cylinder pressures and temperatures and slow flame propagation which decreases system efficiency.

While water injection and humid air injection may have some ability to reduce engine knock, various shortcomings persist: entropy produced from large thermal gradients required during liquid vaporization; corrosion from surface wetting; and cooling the combustion process. Humid air cycles have temperature increases during compression equivalent to dry air compression limiting the efficiency of the combustion system. Thus, there is an ongoing demand for further contributions in this technical arena.

SUMMARY

One embodiment of the present invention is a unique engine thermal management system. Other embodiments include unique methods, systems, devices and apparatus involving managing intake air cooling, compression intercooling and/or wet combustion with an engine thermal management system. Further embodiments, forms, features, objects, aspects, benefits, and advantages of the present invention shall become apparent from the figures and descriptions provided herewith.

DETAILED DESCRIPTION OF REPRESENTATIVE EMBODIMENTS

Figure 1:
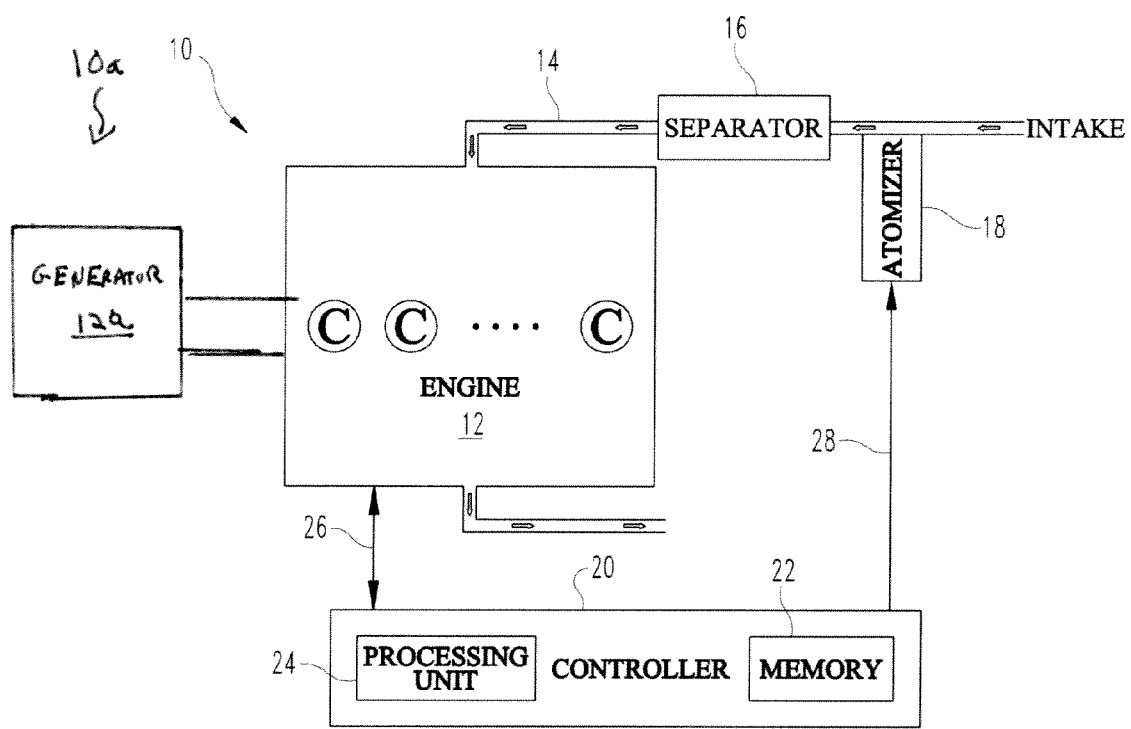
FIG. 1 is a schematic diagram of a system with an engine relating to one embodiment.

For the purposes of promoting an understanding of the principles of the invention, reference will now be made to the embodiments illustrated in the drawings and specific language will be used to describe the same. It will nevertheless be understood that no limitation of the scope of the invention is intended. Any alterations and further modifications in the described embodiments, and any further applications of the principles of the invention as described herein are contemplated as would normally occur to one skilled in the art to which the invention relates.

One embodiment of the present application includes an apparatus and method for a reciprocating internal combustion engine for altering the isentropic or polytropic index of compression by adding a non-gas matter with a sufficiently large surface area to maintain a low thermal gradient during the phase changes throughout intake and compression strokes. One specific example of this embodiment is the addition of fine water droplets (<5 micron) to the intake air stream where the droplets act as an intercooler during the compression stroke, reducing peak charge air temperature, and thus reducing the tendency for the engine to knock.

Wet compression is an engine conditioning process which utilizes droplets that behave as though they are integral parts of the intake air while remaining in liquid form. For example, the droplets cool a majority of the intake air uniformly to avoid hot spots. For wet compression conditions during air intake, smaller droplets may contribute to improved dispersion in the charge air. For a similar volume of liquid, the separation between droplets is less with smaller diameter droplets, and correspondingly provides more cooling points and keeps the bulk temperature closer to a saturation temperature. When small droplets avoid contact with surfaces and substantially vaporize before the combustion process begins, the efficiency of the system should increase. These conditions may be met if the droplets are sufficiently small.

In another embodiment, entrained droplets in the intake air improve the volumetric efficiency of a reciprocating internal combustion engine. Under normal conditions as reciprocating internal combustion engines draw air into the cylinder, the fresh air mixes with residual exhaust and typically is heated by the cylinder walls, piston, and head. This heating causes the gas to expand, thus reducing the amount of air introduced to the cylinder in each cycle. Under wet compression conditions, the entrained droplets keep the charge air cool, which increases the charge air density which may contribute to increased power density.

Unfortunately, introducing liquid to the compression stage of an engine may increase system entropy. Heat flows from the compressing air to the liquid to force the liquid droplets to vaporize. This heat transfer is driven by a thermal gradient. Heat transfer across a thermal gradient increases entropy, and the larger the thermal gradient, the more entropy is produced. In one embodiment a condition for liquid introduction to the compression stage is a significant amount of liquid surface area therefore there is a reduced thermal gradient utilized for the heat transfer. Liquid droplet diameter reductions generally increase the surface area for a given amount of liquid. The reduced thermal gradient of the reduced diameter liquid droplets may provide a reduced entropy level and result in improved efficiency of the combustion system.

Liquid that is present beyond the intake and compression stages and continues into the combustion stage may have ill effects. The thermal gradient tends to be large for the heat transfer, since the combustion temperature is hot while the liquid is still at its saturation temperature. Combustion temperatures may remain high before vaporizing the water, allowing elevated NOx formation. If a similar amount of water were vaporized before combustion, it may improve NOx emissions and efficiency.

Further, when droplets carry into the combustion stage, the phase transformation tends to cool the combustion process. Wet combustion may decrease system efficiency due to a lower temperature and therefore a decreased pressure rise compared to dry combustion, as well as slower flame propagation. Systems designed for intake air cooling or inter-cooling with wet compression may find it advantageous to avoid operations that may create wet combustion conditions.

Understanding the parameters that affect droplet vaporization contributes to wet compression optimization. The energy consumed during liquid vaporization drives the inter-cooling effects of wet compression. Droplet diameter is one parameter for vaporization properties. For a given quantity of water for one embodiment, the time required for droplet vaporization is partially dependant upon the diameter of the droplet squared. At a constant thermal gradient relative to the bulk gas temperature, the time to vaporize a liquid droplet scales approximately quadratically with the droplet diameter. With a similar thermal gradient, a 5 μm droplet will likely vaporize in approximately $1/16^{th}$ the time of a 20 μm droplet and a 1 μm droplet will likely vaporize in approximately $1/400^{th}$ the time because of the surface to volume ratio and dispersion effects of smaller droplets.

In one embodiment, the average droplet diameter is less than 10 microns. In another embodiment, droplet diameter is equal to or less than 5 microns for droplets comprised of water. In yet another embodiment, it was surprisingly discovered that a desirable inter-cooling effect may be achieved by keeping the maximum diameter of each droplet to less than 2.7 microns in a 1200 RPM engine with the droplets comprised of water.

Water injection generally uses large droplets of water, 20 μm to over 100 μm, and is intended to cool the combustion by vaporization and air/fuel dilution. Large droplets may provide limited cooling during the compression stroke. In contrast to one embodiment of the present application, wet compression uses small droplets, 1 μm or less to 5 μm, to allow faster vaporization, acting as an inter-cooler for the compression stroke and more fully vaporizing before combustion. Small droplets generally are able to more fully vaporize before combustion and contribute to reduced entropy production during vaporization. While the inter-cooling effect may be more efficient, the effect may also utilize less water to provide a similar knock margin and NOx reduction. Less water is utilized since inter-cooling contributes to reduced compression work, therefore requiring less energy dissipation.

It should be appreciated that the fast vaporization rate of small droplets tends to reduce corrosion and oil-loss sometimes associated with water injection. Small droplets can potentially vaporize in less than a millisecond when exposed to large thermal gradients. Thus if a small droplet is on a trajectory toward the cylinder wall, the heat from the cylinder will likely vaporize the droplet before it is able to contact a cylinder surface. A larger droplet would take longer to vaporize, and may enable liquid-solid contact. It should be appreciated that small diameter liquid droplets are better able to follow airflows effectively as compared to large vapor droplets, thus making port injection schemes possible as an alternative to direct injection.

Typically, it is desired that droplets follow airflow to avoid wetting internal surfaces. Larger droplets, common to water injection systems, are more likely to collide with engine surfaces. Surface wetting decreases compression inter-cooling effectiveness and may cause corrosion issues. Droplets that collide with internal surfaces decrease their ratio of surface area to volume, which reduces the positive effects of wet compression. Liquids on internal surfaces may also become a source for possible corrosion or lubricant removal. As the surface area to volume ratio of the droplets increases, so does the droplet trajectory's dependence upon the surrounding airflow.

As the droplet temperature increases from heat flow, the droplet reaches its saturation temperature and vaporizes. The heat used to create this vaporization would otherwise be used to increase the temperature of the compressing air, thus droplet vaporization may effectively reduce compression temperature, suppressing knock. During compression the pressure also increases, thus the saturation temperature increases throughout the compression stroke. Vaporization adds to the total number of gas molecules in the compression chamber, thus it also adds to the total chamber pressure. This allows the isentropic or polytropic index of compression for temperature to be lower than the effective isentropic or polytropic index of compression for pressure.

Entrainment and vaporization rate requirements suggest small, uniform water droplets. Creating micron diameter droplets is difficult for injectors using air or water pressure for atomization. One embodiment includes a technology that can create droplets that are small and uniform which is referred to as ultrasonic atomization. Ultrasonic atomizers can produce water droplets with diameters lower than 1 µm. Ultrasonic atomizers effectively create microscopic waves that spray water into the air stream. Droplet size depends upon driving frequency, which can be tightly controlled. The ability of an engine management system to tightly control the droplet size may contribute to the optimization of the engine operations.

Generally, certain applications utilizing ultrasonic atomizers may be placed as closely as possible to the intake valves to reduce droplet agglomeration. One embodiment includes ultrasonic atomizers, followed by a large droplet separator apparatus, followed by an intake valve in close communication. In one approach, the large droplet separator can act as the water/air/fuel mixer.

In other embodiments, additional techniques for droplet formation are possible such as electrostatic atomization. While electrostatic atomization is capable of creating fine droplets, electrostatic atomization may not be desired in certain embodiments that include a spark ignited engine due to the electrical discharge that it may generate.

Another embodiment may include flash atomizers to provide similar atomization. Flash atomizers create small droplets by heating pressurized liquid so that a portion boils when released from the atomizer to a lower pressure. The boiling action breaks an initial large droplet into smaller droplets. This action may take place in a continuous atomizer or heated injector (presumably common rail injector). Flash atomization also enables in-cylinder injection in a reciprocating internal combustion engine, which can enhance performance and controllability of the wet compression process. Flash atomization may also be accomplished by adding a gas that is highly miscible in the injected coolant at high pressure but escapes as a vapor at low pressures to avoid heating the liquid. For, example, carbon dioxide dissolves in water at high pressures, but causes secondary atomization when released to lower pressures, even at ambient temperatures.

Flash atomization may be done by a steady-state atomizer, port injector, or direct in-cylinder injection (in order of increasing complexity and control capabilities). For one embodiment, a common rail injector holds fluid around 200 bar. At 200 bar liquid water can be heated to over 200° C. without vaporizing. Upon the injector opening, the pressurized hot water is released to a lower pressure, e.g. 1 bar. At 1 bar, 200° C. is above the boiling temperature for water. The liquid droplet atomized from the injector begins to boil, including internal vaporization. Internal vaporization contributes to a primary droplet breaking into many smaller droplets. Small secondary droplets are then available for wet compression applications.

Following atomization, injection may take place inside the combustion chamber or outside the combustion chamber. Within the combustion chamber, liquid can be injected during the intake stroke or just after the intake valve closes. Both internal injection and external injection before the intake stroke improves volumetric efficiency by cooling the intake charge air, thus increasing its density. Internal injection after the intake valve closes provides greater cooling for a similar amount of liquid injection due to a smaller air mass. Internal injection enables injection timing optimization that minimizes internal surface wetting by injecting at a rate similar to the vaporization rate. Matching injection and vaporization rates minimizes the residence time of water droplets in the power cylinder. While internal injection provides greater control, injectors outside of the combustion chamber are generally less expensive.

It should be appreciated that any liquid may be flash atomized. In an illustrative embodiment, ethanol, or ethanol/water mixes, can be injected as the primary fuel, with flash atomization increasing wet compression, and correspondingly the upper efficiency limit, as well as improved combustibility since more fuel is vaporized before combustion. This injection technique can also enhance engine efficiency with gasoline, though gasoline provides less cooling since it has a relatively lower enthalpy of vaporization. Alternatively, inert liquids such as water may be injected to provide cooling exclusively.

The source of the liquid coolant may be an issue as much as the choice of coolant. Some liquid source contamination, such as carbon particles in condensed exhaust gas vapors, may be benign to the engine, but may cause significant harm to injectors. Ultrasonic atomizers usually do not rely on small openings like pressurized injectors, and so they are less likely to plug due to contamination. Additionally, ultrasonic atomizers spray anything carried in the water supply, and so the water supply content should be considered.

In other embodiments, wet compression utilizes a source of engine-safe water. The water source may be met by three exemplary conditions: stationary primary power such as combined heat and power systems (CHP), exhaust gas recirculation (EGR), and exhaust water recovery systems similar to those used in fuel cells. CHP systems are generally connected to water supplies, and adding components, such as water purifiers, generally will not significantly add to the system size. EGR cooling systems provide for the uncontrolled introduction of water to the engine after precipitation in the cooler. Alternatively, condensation from EGR coolers may be collected and finely atomized to enable wet compression.

In one approach, cooled EGR water from an exhaust gas condenser may serve as an adequate liquid source. Alternatively or additionally, external water may be used with filtering and/or distilling as desired. Because there is already significant heating and cooling taking place in engines, integrated distillation systems may be a cost effective approach to providing clean water.

In another embodiment, the droplets removed from the air stream may be collected and returned to the entrainment system to attempt to re-introduce them at a reduced size. Droplet recycling applies in cooled EGR applications, for example, where large water droplets are present in the air-fuel stream and may provide a majority of the water for the atomizer, which reduces the need for external water supplies. Water may also be recycled from the exhaust gas independent of other exhaust systems such as an EGR cooler.

One approach to increasing effectiveness of wet compression includes removing liquid droplets that are larger than desired. Droplet separation increases the cycle efficiency by removing droplets that would otherwise cool the combustion process. Separation also increases liquid use efficiency by enabling liquid recycling. For example, a 100 micron diameter droplet that is captured and recycled can produce 1,000,000-1 micron diameter droplets which would have 10,000 times the total surface area—significant for cooling.

Droplet separation may be done by several processes known in the art, for example, inertial separation or a screen. Inertial separation, which uses the difference in mass vs. surface area between small and large particles, may take place in a cyclonic separator. Another inertial separator uses barrier plates that the airflow is directed around. Either a cascading impactor or virtual impactor may be used for this type of separation. Larger droplets may find it more difficult to follow the airflow around the barrier plates and impinge on the surfaces. A screen may provide barriers of known separation that don't allow larger droplets through. Such a screen may have wire spacing less than 10 microns. Another embodiment may utilize air filtration with certain adjustments relative to other standard intake pathway components. This embodiment may locate a droplet separator after the intercooler and throttle.

In certain implementations, droplet separation may be placed after the liquid or particle injection into the gas stream to remove large particles that may cause ill effects when entering the cylinder of a reciprocating internal combustion engine. Smaller droplets are allowed to pass through, enabling wet compression to take place. A majority of larger particles are removed and may be recycled into smaller droplets and entrained in the airflow again. Other separator methods may include gravitational or electrostatic forces to name a few.

Wet compression that takes place throughout the compression stroke may over-cool the air/fuel mixture. A hybrid condition between wet and dry compression may provide optimal efficiency for a wide variety of compression ratios. A hybrid cycle begins with wet compression. Wet compression at the beginning of the hybrid cycle minimizes entropy production during vaporization while reducing the temperature increase during compression. The appropriate amount of liquid is injected to force a transition to dry compression during the compression stroke after the liquid fully vaporizes. The hybrid cycle enables the pre-ignition temperature to be as high as possible without knocking. The elevated temperature addresses the efficiency loss from full wet compression. When the coolant completely vaporizes during compression, there is no further cooling during combustion and expansion, leaving a more optimal isentropic or polytropic index of compression. The index of compression may be isentropic for systems behaving as ideal gases or polytropic for conditions when the ideal is not achieved.

The hybrid wet and dry compression cycle may deliver an exemplary knock-free efficiency for compression ratios above the knock limit for dry compression. The optimal wet compression for a given pre-ignition temperature limit may be determined. The knock limited compression ratio may be over 40:1, with over 70% theoretical efficiency possible. This knock-free compression ratio is possible due to the cooling effects of wet compression, which limit the temperature and pressure rise that is likely to otherwise occur with dry compression.

In addition to improving efficiency, wet compression enables greater engine control. The pre-ignition temperature may be controlled by adjusting the duration of wet compression. The duration of wet compression may be set by the amount of liquid or solid coolant that is added to the charge air. With a flash atomized injector in one embodiment, liquid injection may vary from cycle to cycle, similar to common rail diesel injectors. The control of wet compression ratio may enable rapid control of pre-ignition temperatures and pressures.

Pre-ignition temperature control provides many of the same benefits as variable compression ratio engines. As the fuel quality, air-fuel ratio, or inlet air conditions change, the knocking characteristics of the engine change. Wet compression may enable the engine to adapt to these changes on a cycle by cycle basis. Homogeneous charge compression ignition (HCCI) is one application that requires control over air/fuel conditions at or near top dead center. Well controlled wet compression may enable the engine to adapt to autoignition changes due to fuel or charge air changes. As charge air conditions change in one cycle, the injector may adjust the amount of liquid injected in the next cycle to maintain robust HCCI. Well controlled wet compression may provide the benefits of a variable compression ratio engine, but with the possibility of controlling and optimizing each engine cycle and cylinder separately.

Because the air/fuel mixture is cooled during compression, the pressure increase may be lower than it would be without cooling. Although the compression ratio may be relatively high, the pressure ratio and temperature ratio for the start of compression relative to the end of compression is lower than the temperature and pressure ratios for the expansion stroke. This difference in pressure and temperature ratios makes the inter-cooling by wet compression operate in a manner similar to miller cycle engines, but with improved power density.

By introducing sufficiently small liquid droplets to the air-flow, the liquid becomes entrained and keeps the charge air cool during the intake stroke. The introduction of the small droplets may increase the total volumetric efficiency, and thus also increase the power density. Although the amount of liquid may be increased to induce wet compression, small amounts of liquid will generally induce improved volumetric efficiency. Though reference is made to liquid introduction, phase change is believed to be the principle mechanism, thus solids may also be used.

At low levels of micro-droplet water introduction during the intake stage in one embodiment, the droplets often vaporize before reaching the compression stage. Some droplets may keep the intake air cool as it is heated by the surrounding cylinder walls, piston, and cylinder head, as well as the remaining exhaust leftover from the previous cycle. By reducing the charge air temperature, more air is likely to enter the cylinder, which correspondingly increases the power density. Intake air cooling can improve performance of both compression ignition and spark ignition engines.

Engines generally require higher compression ratios or more advanced ignition timing to increase efficiency. Increasing compression ratio and advancing ignition timing generally increases $NO_x$ emissions. In another embodiment, wet compression lowers pre-ignition temperature, therefore lowering peak temperature, and additionally lowering $NO_x$ emissions while still providing high compression ratios and ignition timing in a thermodynamically efficient manner without the propensity to knock. Though this applies mainly to spark ignition engines, it also reduces $NO_x$ production in compression ignition engines, even at high compression ratios and advanced injection timing.

Although there is a potential to improve knock margin and reduce NOx production, uncontrolled introduction of liquid to an Otto or Diesel cycle engine may also increases cycle entropy, thus decreasing cycle efficiency. Overall system efficiency increases are made possible by the present application. Wet compression under optimized conditions may allow advanced ignition timing, higher brake mean effective pressure (BMEP), lower combustion temperature, and higher compression ratios, each of which may contribute to system efficiency.

Wet compression is capable of reducing pre-combustion temperature and pressure. These pre-combustion effects may be beneficial for knock reduction but can be detrimental to efficiency. Excessive wet compression may lead to significantly lower pre-combustion pressure, such that the combustion process provides a smaller peak pressure, and results in lower efficiency. Wet compression may provide more cooling than pressure reduction, so if the compression ratio is increased to the knock limit, the cycle efficiency will improve.

Engine knock generally limits the maximum boost pressure available in a reciprocating internal combustion engine. This knock limit to boost pressure relation may be applied to engines with stoichiometric air/fuel mixtures. In one embodiment, wet compression suppresses knock by reducing the pre-ignition temperature of the air/fuel mixture. This knock suppression enables higher boost pressures, increasing the power density and BMEP, which tends to increase system efficiency. In another embodiment, wet compression differs from water injection because the liquid is more completely vaporized before combustion, thus enabling an efficient combustion process and improved cycle efficiency.

Homogeneous charge compression ignition (HCCl) engines operate by compressing the air/fuel mixture such that it auto-ignites near the end of the compression stroke. In such applications, the system operates to time the auto-ignition temperature, which if too early tends to cause the engine to knock heavily and if too late the engine may not fire at all. As the air/fuel mixture conditions change, the auto-ignition temperature also changes. Thus changing power output generally includes a change in the temperature reached at the end of the compression stroke.

In yet another embodiment, wet compression may enable control over the maximum temperature reached during the compression stroke by providing cooling early during compression. In this embodiment, a compression ratio is set to provide HCCl during lean operation. As the air/fuel mixture becomes richer, the auto-ignition temperature is lowered, causing early ignition. Adding more fine water droplets can reduce the temperature rise from compression and delay auto-ignition to the appropriate time. The logic to change the quantity of water added may be dependant upon sensors detecting the combustion conditions of the previous cycle or cycles. In addition to HCCl control, the logic may also control incipient knock in an engine. When the engine power requirement is reduced, micro-droplet production may be reduced, reducing cooling and enabling auto-ignition at the appropriate time.

One aspect of wet compression is an inter-cooling effect during compression. An injected liquid quantity may be adjusted to have wet compression only at the beginning of the engine cycle with most of the compression stroke taking place with only gases. Because wet compression may reduce knock, enable higher boost pressures, increase compression ratio, advanced spark timing, etc., an operating condition may be determined by engine designers after removing knock limits from their existing optimization routines.

Insulating the combustion chamber in a reciprocating internal combustion engine is known to improve fuel conversion efficiency by retaining more of the heat in the cylinder during expansion. Combustion chamber insulation also provides hotter exhaust gases, which increases the potential efficiency gained by combined heat and power systems and bottoming cycles such as turbo-compounding or Rankine cycles to improve total system efficiency. Conversely, the heat retained by the combustion chamber insulation after combustion contributes to knock in spark ignition engines and higher $NO_x$ emissions in both Otto and Diesel cycle engines. Wet compression may alleviate negative effects of combustion chamber insulation for both Otto cycle and Diesel cycle engines.

Engine insulation has generally been limited to compression ignition engines due to the knock issues in spark ignition engines. Research has been done on adiabatic spark ignition engines, but no viable design has resulted due to the knock limiting aspects. An embodiment of the present invention enables high compression ratio and boost for an insulated spark ignition internal combustion engine.

Wet compression contributes to the reduction and/or elimination of the ill effects of combustion chamber insulation by assisting to cool the combustion chamber gases before compression. Evaporative cooling by wet compression enables high compression ratios by reducing the index of compression, which allows lower temperature rises during compression.

In one embodiment, cylinder insulation may be more effective with wet compression due to a larger relative effect. Additionally, the ill effects of cylinder/piston/head insulation, specifically increased knock tendency and NOx formation, may be reduced or eliminated (assuming other mechanisms such as but not limited to a three way catalyst is used in stoichiometric combustion).

For one embodiment, wet compression contributes to lowering the in-cylinder temperature in a reciprocating internal combustion engine to suppress knock and enabling combustion chamber insulation. Combustion chamber insulation may be an insulating coating of the piston, head, or cylinder where the insulating coating may be made of a ceramic. It also includes creating engine components such as the piston, head, or cylinder out of insulating materials. Wet compression may also enable insulation on diesel engines while maintaining low NO production and high volumetric efficiency.

Some alternative fuel designs are made more viable by one embodiment of a system designed for wet compression. When bio-ethanol is produced under certain conditions, the fuel is often separated from the water that was used in the biological processing. Initial separation may take place by distillation; final water/ethanol separation may take place with rechargeable desiccants. Final separation adds cost and complexity to the ethanol production process. Making an engine run on water/ethanol mixes can reduce the processing requirements for ethanol production. Utilizing water/ethanol mixes as fuel could reduce the processing demands, and thus fuel cost, for ethanol. Using current methods however, water/ethanol is difficult to reliably ignite due to the high latent heat of vaporization and the need for ethanol to be in gaseous form to ignite.

Simultaneously, evaporative cooling and wet compression with pure water is less efficient due to the surface tension of water complicating the creation and vaporization of small droplets. Adding ethanol to water generally reduces the surface tension and boiling point of the water, simplifying atomization and the resulting smaller droplets.

One embodiment uses the high latent heat of ethanol/water mixes to provide the benefits of evaporative cooling and wet compression by finely atomizing the water/ethanol mix. This fine atomization (<5 μm diameter) is made easier than with just water partly due to the surface tension reducing qualities of ethanol in water. The benefits of evaporative cooling and wet compression may enable higher compression ratios and reduced engine cooling (via insulated combustion chamber). The high compression ratio and insulated engine contribute to improving efficiency and power density while reducing cold-starting problems generally associated with ethanol/water mixes. In one embodiment of a direct injection engine, high compression ratio and insulated engine design may be used to provide open-throttle power management, further increasing efficiency.

In one embodiment, un-throttled power output can be controlled by timing the ethanol/water injection in the case of direct injection engines. Injection during the intake stroke may improve the evaporative cooling effect during intake, and correspondingly increase the engine's volumetric efficiency. Injection after the intake valve closes generally does not provide evaporative cooling during intake, thus a reduced amount of air may enter the power cylinder. Evaporative cooling and wet compression effects may take place during compression to contribute to the high compression ratio and efficiency.

Increasing the compression ratio too dramatically may cause catastrophic failure upon disruption of the liquid delivery system—having the potential to result in excessive knock. Other system optimizations may take place which would not make water disruption catastrophic.

In one embodiment, small amounts of water introduced to the intake air can benefit the engine in ways that are not completely dependant upon the liquid delivery system. Wet compression allows: ignition timing advances, higher knock-free boosting (reducing friction effects on efficiency), and/or reduced combustion temperatures (improving NOx and reducing heat transfer to the engine wall). These effects are present when, in one embodiment, re-optimizing an engine utilizes wet compression but does not catastrophically fail without it. The system may be designed such that if the water system fails, the engine may run sub-optimally with turbo-boost reductions and delayed ignition timing, but may not catastrophically fail.

FIG. 1 depicts a system 10 of one embodiment with an engine 12 which is of the reciprocating piston type having one or more reciprocating pistons C. In one form, engine 12 is of the four stroke diesel-fueled type with compression ignition and fuel injection. In other embodiments, engine 12 can be of a spark-ignited type, the two-stroke type, a rotary type such as a wankel engine, and/or may not utilize any form of fuel injection, to name just a few alternative possibilities. Furthermore, other embodiments may be differently fueled, such as by gasoline, ethanol, hydrogen, natural gas, propane, other gaseous fuels, and/or a hybrid combination of fuel types—just to mention some possibilities. It is also contemplated that system 10 may, as an alternative to being used to provide power to mobile applications such as vehicles, provide power to stationary applications, such as electrical power generators, pumps, and the like. On such implementation is depicted as stationary system 10a, and more specifically depicted with electric power generator 12a being driven by engine 12—it being understood that both other stationary and mobile applications (not depicted) are also contemplated to be within the scope of the present application. In addition, system 10 may be used in hybrid applications that include one or more power sources in addition to engine 12, such as batteries, fuel cells—to name a few.

Engine 12 includes an air intake stream 14. Air intake stream 14 is in fluid communication with a liquid atomizer 18. Liquid atomizer 18 may be an ultrasonic atomizer, flash atomizer, electrostatic atomizer or other suitable type known to one skilled in the art. As air enters air intake stream 14, liquid atomizer 18 provides liquid droplets to the air. As the air with entrained liquid droplets continues through the air intake stream 14 of this embodiment, the liquid droplets are separated based on size by flowing through a liquid droplet separator 16. Some embodiments may not include a separator as shown in FIG. 1 or separator 16 may be configured or positioned to be more integrated with engine 12 or atomizer 18. Liquid droplet separator 16 may be an inertial, gravitational or screen based separator. An inertial separator may be cyclonic or transverse flow through parallel plates. After passing through liquid droplet separator 16, the air with entrained liquid droplets enters engine 12 during an intake cycle.

A controller 20 is connected to and communicates with an atomizer control signal pathway 28 and various devices of engine 12 through a set of engine control signal pathways 26. Typically, controller 20 may be included in a standard type of Engine Control Module (ECM), including one or more types of memory 22. Controller 20 can be an electronic circuit comprised of one or more components, including digital circuitry, analog circuitry, or both. Controller 20 may be a software and/or firmware programmable type; a hardwired, dedicated state machine; or a combination of these.

In one embodiment, controller 20 is a programmable microcontroller solid-state integrated circuit that integrally includes one or more processing units 24 and memory 22. Memory 22 may be comprised of one or more components and may be of any volatile or nonvolatile type, including the solid state variety, the optical media variety, the magnetic variety, a combination of these, or such different arrangement as would occur to those skilled in the art. Further, while only one processing unit 24 is specifically shown, more than one such unit may be included. When multiple processing units 24 are present, controller 20 may be arranged to distribute processing among such units, and/or to provide for parallel or pipelined processing if desired. Controller 20 functions in accordance with operating logic defined by programming, hardware, or a combination of these.

In one form, memory 22 stores programming instructions executed by processing unit 24 of controller 20 to embody at least a portion of this operating logic. Alternatively or additionally, memory 22 stores data that is manipulated by the operating logic of controller 20. Controller 20 may include signal conditioners, signal format converters (such as analog-to-digital and digital-to-analog converters), limiters, clamps, filters, and the like as needed to perform various control and regulation operations described in the present application. Controller 20 receives various inputs and generates various outputs to perform various operations as described hereinafter in accordance with its operating logic.

Figure 2:
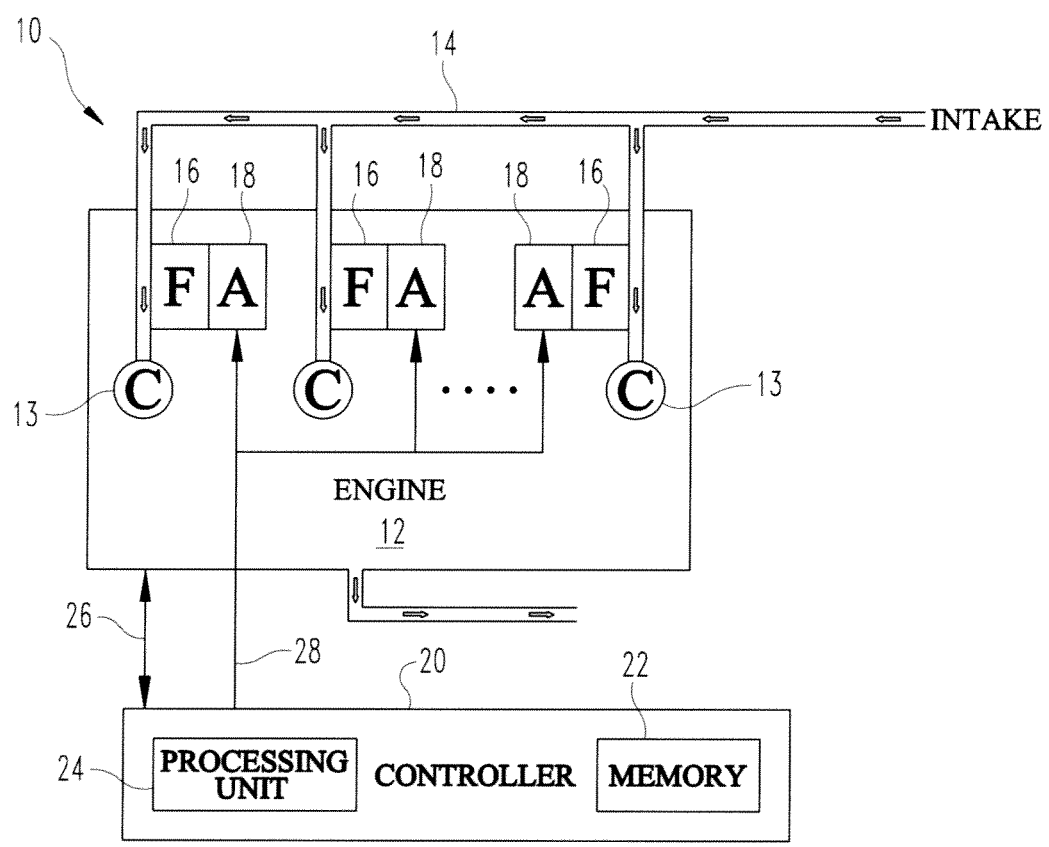
FIG. 2 is a schematic diagram of a system with an engine relating to another embodiment.

FIG. 2 illustrates a further embodiment of a system 10 with an engine 12 having one or more reciprocating pistons C positioned in a cylinder 13 and an air stream 14. For each cylinder 13 of engine 12, a liquid atomizer 18 and a liquid droplet separator 16 are positioned in close proximity to cylinder 13. One embodiment allows for injection of liquid droplets into air stream 14 just before entering cylinder 13. Another embodiment allows for direct injection of liquid droplets atomized by liquid atomizer 18 and separated by liquid droplet separator 16 into cylinder 13. In a further embodiment, each liquid atomizer 18 alternatively communicates directly with cylinder 13 without liquid droplet separator 16. Each liquid atomizer 18 is in communication via lines 28 with controller 20 to allow optimization of engine operating parameters via lines 26 on an individual basis based on wet compression performance in each cylinder 13.

Figure 3:
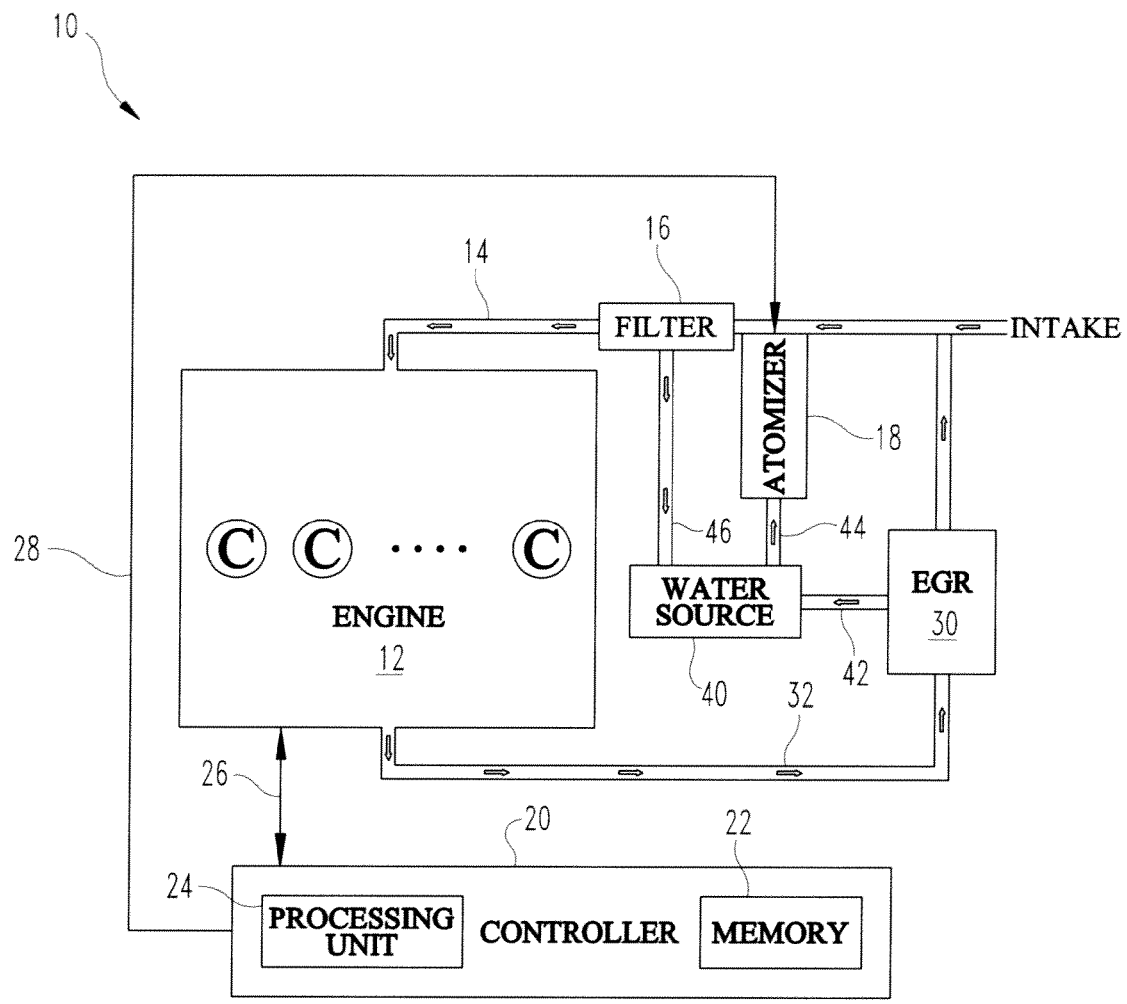
FIG. 3 is a schematic diagram of a system with an engine relating to yet another embodiment.

FIG. 3 illustrates yet another embodiment where a system 10 includes an engine 12 with reciprocating pistons C similar to the embodiment shown in FIG. 1. Engine 12 includes an air intake stream 14 and an exhaust air stream 32. Air intake stream 14 is in fluid communication with a liquid atomizer 18 and a liquid droplet separator 16. Exhaust air stream 32 is in fluid communication with an EGR system 30. A water source 40 is in communication with EGR system 30 to receive water via line 42 from recirculating exhaust gases. Water source 40 is in further communication with liquid atomizer 18 to supply water via line 44 to liquid atomizer 18 for droplet formation. Water source 40 is also in communication with liquid droplet separator 16 to receive water via line 46 from large droplets separated out of the air stream.

The index of compression whether isentropic or polytropic is adjusted with wet compression resulting from the selective and controlled injection of small water droplets in the air intake of a reciprocating engine. In one embodiment, controller 20 may be responsible for collecting engine operating parameters and establishing the related engine operation limits to induce efficient and optimized compression and combustion conditions while limiting engine knock and NOx emissions.

Various engine operating parameters contribute to engine operating limits. Most reciprocating engines monitor fuel quality, air/fuel ratio and intake air temperature as each of these parameters may be a factor in engine performance. Further parameters such as charge air temperature, charge air density and peak pressure can be used to determine engine operating limits or used as an engine operating limit directly. Pre-ignition temperature can be used as an engine operating limit when controlling knock conditions. A knock detector may also provide readings to be used as an engine operating limit. Additionally, a $NO_x$ detector may provide readings for an engine operating limit.

Engine operating limits are determined to optimize engine performance including eliminating engine knock, increasing volumetric efficiency and increasing over all peak performance and efficiency. A wet compression level can be calculated that allows control over the engine operating parameters for each cycle of the piston and cylinder in the engine. One embodiment would include a wet compression injection schedule that can be modified on a cycle by cycle basis.

Figure 4:
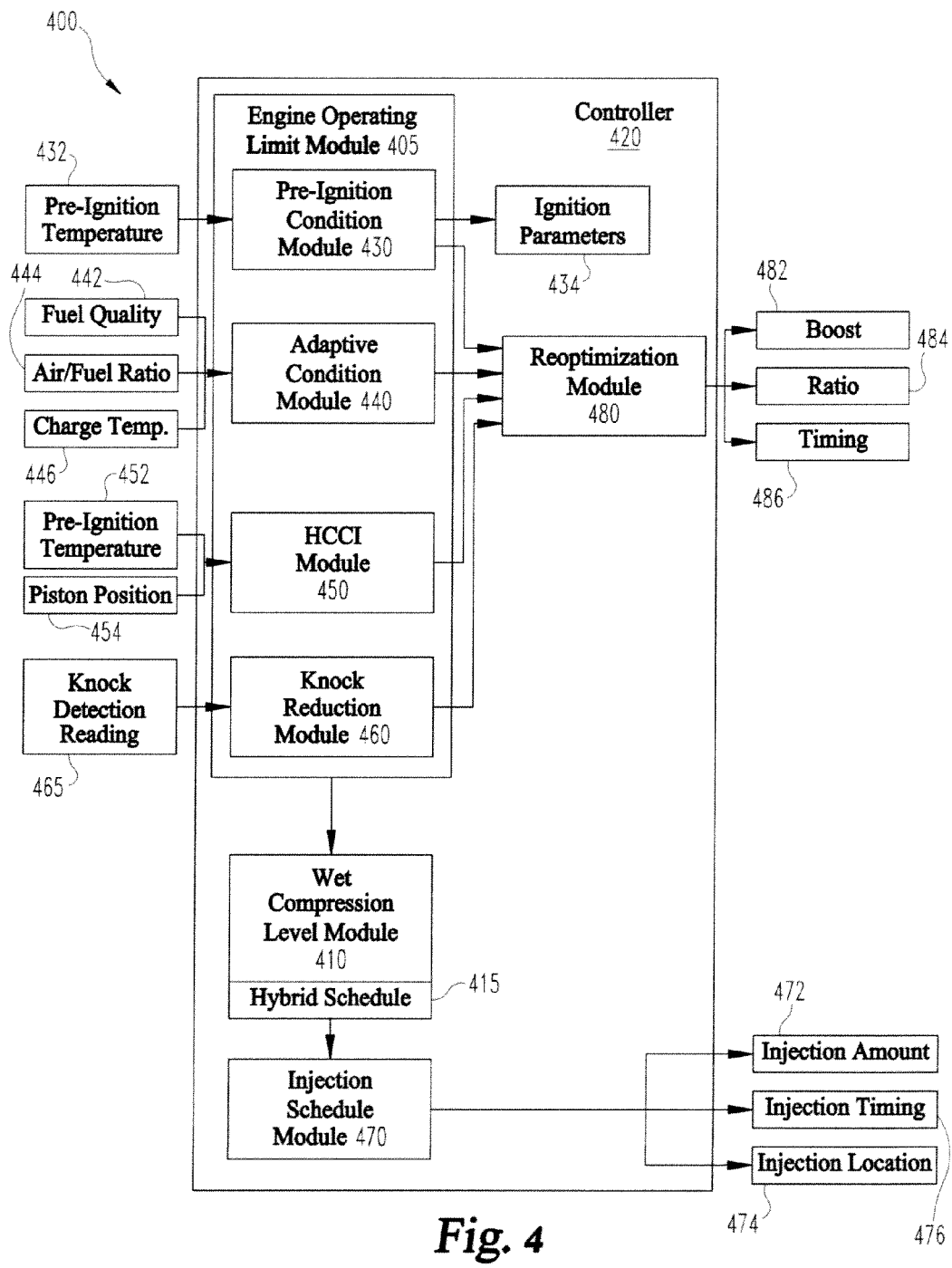
FIG. 4 is a diagram illustrating an exemplary controller for engine thermal management.

Controller 20 may adjust additional engine operating parameters as the logic performs a re-optimization module where the engine conditions are based on the resulting performance with wet compression. In FIG. 4, an embodiment is shown with apparatus 400 which includes controller 420 with various components illustrated as representative modules, inputs and outputs.

Engine operating limit module 405 is structure to determine operating conditions in a number of modules which may be controlled when a wet compression level is applied in response to the engine operating limit.

One embodiment is shown as Module 430 which is a pre-ignition condition module 430 structured to determine engine operating limits including a desired temperature change based on a detected pre-ignition temperature 432 and ignition parameters 434 selected for optimized engine performance. The temperature change is used by wet compression module 410 to determine a level of wet compression capable of accomplishing the temperature change.

Another embodiment is shown as Module 440 which is an adaptive performance module structured to determine engine operating limits to allow dynamic response to changes in engine conditions such as, but not limited to, fuel quality 442, air/fuel ratio 444 and intake or charge air temperature 446. The engine operating limits are used by wet compression module 410 to determine a level of wet compression capable of accomplishing the engine operating change.

Yet another embodiment is shown as Module 450 which is an HCCI module 450 structured to determine engine operating limits for a homogeneous charge compression ignition engine including an auto-ignition timing based on auto-ignition conditions 452 of the last cycle or a function of some number of previous cycles selected to ensure optimal ignition sequencing with piston position 454. The engine operating limits are used by wet compression module 410 to determine a level of wet compression capable of accomplishing the auto-ignition timing.

Still another embodiment is shown as Module 460 which is a knock reduction module 460 structured to determine engine operating limits based on knock detection readings 465. The engine operating limits are used by wet compression module 410 to determine a level of wet compression capable of accomplishing the knock reduction.

Module 410 is a wet compression level module 410 structured to determine a level of wet compression to achieve the engine operating limits determined in module 405. One specific embodiment may include determining a wet compression level incorporating a hybrid compression schedule 415.

Module 470 is an injection schedule module 410 structured to determined an injection amount 472, an injection timing 474, and an injection location 476 to provide the determined wet compression level from module 410.

A further embodiment is shown as Module 480 which is a reoptimization module 480 structured to determine engine performance parameters that may be re-optimized following the reduction of knock limits with wet compression. Some of the performance parameters may include increased boost pressure 482, increased compression ratio 484, and advanced spark timing 486, to name a few.

Many further embodiments of the present application are envisioned. Among the inventions desired to be protected are:

One embodiment includes a reciprocating internal combustion engine with at least one piston and cylinder set and an intake stream; at least one liquid atomizer in fluid communication with the intake stream operable to provide a plurality of liquid droplets with a diameter range less than 10 µm to the intake stream; and a controller wherein the controller is operable to adjust an index of compression for the engine performed on an engine cycle by engine cycle basis by calculating a wet compression level in response to an engine operating limit such as a pre-ignition temperature threshold which may be determined in response to a set of current engine knock detector readings; and adjusting the at least one liquid atomizer in response to the wet compression level by selecting a liquid injection amount; and selecting a liquid injection timing.

A feature of the present embodiment includes at least one liquid droplet separator in fluid communication with the intake stream positioned upstream from the at least one liquid atomizer and downstream from the engine. Another feature includes a diameter range of less than 2.7 μm. The wet compression level may include a feature where an amount of liquid is provided for a transition to a dry compression state after the amount of injected liquid fully evaporates.

A further feature may include a plurality of liquid droplet injectors, a plurality of liquid droplet separators and a plurality of piston and cylinder sets where the liquid droplet injectors and the liquid droplet separators are provided for each piston and cylinder set and where each liquid droplet injector and each liquid droplet separator are in close proximity to each piston and cylinder set. Yet a further feature may include the engine operating limit being determined in response to a set of auto-ignition conditions and where calculating the wet compression level is based on a set of engine cycle conditions changing with each engine cycle.

Another embodiment includes operating a reciprocating internal combustion engine with at least one piston and cylinder set and an air intake stream; atomizing a plurality of liquid droplets with a diameter less than 5 μm; providing the plurality of liquid droplets to the air intake stream; separating the plurality of liquid droplets; providing the plurality of liquid droplets in the air intake stream to the engine; and optimizing an engine operating limit based on the plurality of liquid droplets in the air intake stream including calculating a wet compression level in response to the engine operating limit; and adjusting a liquid atomizer in response to the wet compression level by selecting a liquid injection amount; and selecting a liquid injection timing. Providing the plurality of liquid droplets in the air intake stream to the engine may include injecting the plurality of liquid droplets into the air intake stream according to a liquid droplet injector sequence.

Yet another embodiment includes a reciprocating internal combustion engine with at least one piston and cylinder set and an intake stream; at least one atomizer means for atomizing a coolant in fluid communication with the intake stream operable to provide a plurality of coolant particles with a diameter range less than 5 μm to the intake stream; and a control means operable to adjust an isentropic index of compression for the engine by a means for detecting a knock level of the engine; a means for calculating a wet compression level in response to the knock level of the engine exceeding a knock threshold; and a means for adjusting a coolant atomization control schedule for the at least one atomizer means in response to the wet compression level. Calculating the wet compression level may include determining an amount of coolant particles when the coolant particles are provided on a continuous basis; and determining a duration for providing coolant particles when the at least one means for atomizing a coolant is capable of providing a set amount of coolant particles to the intake stream.

A further inventive apparatus includes: a reciprocating internal combustion engine with at least one piston and cylinder set and an intake stream; at least one liquid atomizer in fluid communication with the intake stream operable to provide a plurality of liquid droplets with a diameter range less than 10 μm to the intake stream; and a controller wherein the controller is operable to adjust an index of compression for the engine by calculating a wet compression level in response to an engine operating limit; and adjusting the at least one liquid atomizer in response to the wet compression level.

Features of the inventive apparatus include at least one liquid droplet separator in fluid communication with the intake stream positioned downstream from the at least one liquid atomizer and upstream from the engine; a diameter range of less than 5 μm or less than 2.7 μm; the plurality of liquid droplets including a fuel/water mix; adjusting the at least one liquid atomizer further including: selecting a liquid injection location, selecting a liquid injection amount, and selecting a liquid injection timing; and a closed system water source in fluid communication with the at least one liquid atomizer.

Further features of the inventive apparatus may include the engine operating limit having a pre-ignition temperature threshold where the pre-ignition temperature threshold may be determined in response to a set of engine knock detector readings and/or where the engine operating limit is determined in response to a set of auto-ignition conditions and where calculating the wet compression level is based on a set of engine cycle conditions changing with each engine cycle. The wet compression level may include an amount of liquid determined to provide a transition to a dry compression state after the amount of liquid fully evaporates. The inventive apparatus may further include a plurality of liquid droplet injectors, a plurality of liquid droplet separators and a plurality of piston and cylinder sets where the liquid droplet injectors and the liquid droplet separators may be provided for each piston and cylinder set and where each liquid droplet injector and each liquid droplet separator may be in close proximity to each piston and cylinder set. Adjusting the index of compression may be performed on an engine cycle by engine cycle basis. The liquid atomizer may further include a process selected from the group consisting of ultrasonic atomization, electrostatic atomization, flash atomization and combinations thereof.

A further embodiment is a method including: operating a reciprocating internal combustion engine with at least one piston and cylinder set and an air intake stream; atomizing a plurality of liquid droplets with a diameter less than 5 μm; providing the plurality of liquid droplets to the air intake stream; separating the plurality of liquid droplets; providing the plurality of liquid droplets in the air intake stream to the engine; and optimizing an engine operating limit based on the plurality of liquid droplets in the air intake stream including calculating a wet compression level in response to the engine operating limit; and adjusting a liquid atomizer in response to the wet compression level by selecting a liquid injection amount and selecting a liquid injection timing.

Further features of this method include providing the plurality of liquid droplets in the air intake stream to the engine by injecting the plurality of liquid droplets into the air intake stream according to a liquid droplet injector sequence and the liquid droplets having a diameter range of less than 2.7 μm.

Yet a further inventive apparatus includes: a reciprocating internal combustion engine with at least one piston and cylinder set and an intake stream; at least one atomizer means for atomizing a coolant in fluid communication with the intake stream operable to provide a plurality of coolant particles with a diameter range less than 5 μm to the intake stream; and a control means operable to adjust an isentropic index of compression for the engine by: a means for detecting a knock level of the engine; a means for calculating a wet compression level in response to the knock level of the engine exceeding a knock threshold; and a means for adjusting a coolant atomization control schedule for the at least one atomizer means in response to the wet compression level. Features of this further inventive apparatus include calculating the wet compression level by determining an amount of coolant particles when the coolant particles are provided on a continuous basis and determining a duration for providing coolant particles when the at least one means for atomizing a coolant is capable of providing a set amount of coolant particles to the intake stream; and where the at least one piston and cylinder set at least partially include insulating material.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or claims that follow are desired to be protected.

What is claimed:

1. An apparatus comprising:
   an internal combustion engine with at least one piston and at least one cylinder and an intake stream;
   one or more liquid atomizers in fluid communication with the intake stream structured to provide a plurality of liquid droplets with a mean diameter less than 10 µm to the intake stream;
   a controller structured to calculate a wet compression level in response to an engine operating limit, wherein the wet compression level corresponds to an amount of liquid determined to fully vaporize substantially throughout compression of the intake stream in the at least one cylinder; and
   at least one liquid droplet injector connected to a combustion chamber of the at least one cylinder,
   wherein the one or more liquid atomizers are responsive to the controller to adjust the wet compression level, wherein the at least one liquid droplet injector is configured to directly inject the plurality of liquid droplets from the liquid atomizer into the combustion chamber during compression of the intake stream in the at least one cylinder, and wherein the wet compression level corresponds to an amount of liquid determined to force a transition to a dry compression state after the amount of the liquid fully vaporizes during compression of the intake stream in the at least one cylinder.

2. The apparatus of claim 1 further including at least one liquid droplet separator in fluid communication with the intake stream positioned downstream from the at least one of the liquid atomizers and upstream from the engine.

3. The apparatus of claim 1 wherein the one or more liquid atomizers include means for providing the majority with the maximum diameter of less than 5 µm.

4. The apparatus of claim 1 wherein the one or more liquid atomizers include means for providing the majority with the maximum diameter of less than 2.7 µm.

5. The apparatus of claim 1 further comprising a stationary application.

6. The apparatus of claim 5, wherein the stationary application includes an electric power generator driven by the engine.

7. The apparatus of claim 1 further comprising:
   means for selecting a liquid injection amount;
   and means for selecting a liquid injection timing.

8. The apparatus of claim 7 further comprising a closed water source in fluid communication with at least one of the liquid atomizers.

9. The apparatus of claim 8 wherein the engine operating limit includes a pre-ignition temperature threshold and further comprising means for determining the pre-ignition temperature threshold as a function of one or more engine knock detector readings.

10. The apparatus of claim 1 wherein the wet compression level corresponds to an amount of liquid determined to provide a transition to a dry compression state after the amount of the liquid fully evaporates.

11. The apparatus of claim 1, wherein the at least one droplet injector comprises a plurality of liquid droplet injectors; wherein the at least one piston and at least one cylinder comprise a plurality of piston and cylinder sets; wherein the liquid droplet injectors are provided for each of the plurality of piston and cylinder sets; and wherein each of the plurality of liquid droplet injectors are in close proximity to each of the plurality of piston and cylinder sets.

12. The apparatus of claim 1 wherein the controller is structured to determine the engine operating limit in response to a set of auto-ignition conditions and to calculate the wet compression level based on a set of engine cycle conditions changing with an engine cycle.

13. The apparatus of claim 1 wherein the at least one of the liquid atomizers includes means for providing ultrasonic atomization.

14. The apparatus of claim 1 wherein the at least one of the liquid atomizers includes means for providing electrostatic atomization to create the plurality of liquid droplets.

15. The apparatus of claim 1 wherein the at least one of the liquid atomizers includes means for providing flash atomization to create the plurality of liquid droplets.

16. An apparatus comprising:
   an internal combustion engine with at least one piston and at least one cylinder and an intake stream;
   one or more liquid atomizers in fluid communication with the intake stream structured to provide a plurality of liquid droplets with a mean diameter less than 10 µm to the intake stream;
   a controller structured to calculate a wet compression level in response to an engine operating limit, wherein the wet compression level corresponds to an amount of liquid determined to force a transition from a wet compression state to a dry compression state after the amount of the liquid fully vaporizes during compression of the intake stream in the at least one cylinder; and
   wherein the one or more liquid atomizers are responsive to the controller to adjust the wet compression level.

* * * * *